United States Patent
Sutter et al.

(10) Patent No.: US 8,377,191 B2
(45) Date of Patent: Feb. 19, 2013

(54) SURFACTANT-STABILIZED ORGANOALKOXYSILANE COMPOSITION

(75) Inventors: Jolanda Sutter, Oberwil (CH); Wolf-Rüdiger Huck, Zürich (CH)

(73) Assignee: Sika Technology AG, Baar (CH)

( * ) Notice: Subject to any disclaimer, the term of this patent is extended or adjusted under 35 U.S.C. 154(b) by 1301 days.

(21) Appl. No.: 11/991,358

(22) PCT Filed: Sep. 1, 2006

(86) PCT No.: PCT/EP2006/065915
§ 371 (c)(1),
(2), (4) Date: Apr. 29, 2008

(87) PCT Pub. No.: WO2007/026015
PCT Pub. Date: Mar. 8, 2007

(65) Prior Publication Data
US 2009/0053411 A1    Feb. 26, 2009

(30) Foreign Application Priority Data
Sep. 2, 2005    (EP) .................... 05108070

(51) Int. Cl.
*C09D 183/08* (2006.01)
*C09D 183/04* (2006.01)
*C09D 7/00* (2006.01)

(52) U.S. Cl. ......... 106/287.11; 106/287.13; 106/287.14; 106/287.15; 106/287.16; 516/55

(58) Field of Classification Search ............ 106/287.11, 106/287.13–287.16; 516/55
See application file for complete search history.

(56) References Cited

U.S. PATENT DOCUMENTS

| | | | |
|---|---|---|---|
| 4,174,229 A | 11/1979 | Boberski et al. | |
| 4,374,879 A | 2/1983 | Roberts et al. | |
| 4,874,229 A * | 10/1989 | Ito et al. | 359/275 |
| 5,314,533 A * | 5/1994 | Goebel et al. | 106/287.13 |
| 5,354,881 A * | 10/1994 | Chang et al. | 556/419 |
| 5,363,994 A * | 11/1994 | Angeline | 222/529 |
| 6,511,752 B1 * | 1/2003 | Yao et al. | 428/429 |

FOREIGN PATENT DOCUMENTS

| | | |
|---|---|---|
| EP | 0 538 555 A1 | 4/1993 |
| JP | A-54-15937 | 2/1979 |
| JP | A-04-39345 | 2/1992 |
| JP | A-05-156164 | 6/1993 |
| JP | A-2000-317389 | 11/2000 |
| JP | A-2002-143765 | 5/2002 |
| JP | A-2002-220224 | 8/2002 |
| WO | WO 93/08198 | 4/1993 |

OTHER PUBLICATIONS

Translation of Office Action issued in Chinese Patent Application No. 200680031694.9 dated Oct. 26, 2010.
Translation of Office Action issued in Japanese Patent Application No. 2008-528531 dated Jun. 21, 2011.
Kollmeier, H.J. et al., "Organo-Polysiloxan Copolymere," *Goldschmidt Informiert*, vol. 4, No. 63, Dec. 1984, pp. 41-48.

\* cited by examiner

*Primary Examiner* — David M Brunsman
(74) *Attorney, Agent, or Firm* — Oliff & Berridge, PLC

(57) ABSTRACT

The present invention relates to organoalkoxysilane compositions which comprise at least one organoalkoxysilane S, and at least one anhydrous surfactant T, where the weight fraction of all of the organoalkoxysilanes S is 33% by weight, based on the weight of the organoalkoxysilane composition, and where the ratio of the weight sum of all of the organoalkoxysilanes S to the weight sum of all of the anhydrous surfactants T (S:T) has a value of from 5:1 to 1:2.

16 Claims, No Drawings

SURFACTANT-STABILIZED ORGANOALKOXYSILANE COMPOSITION

FIELD OF THE INVENTION

The invention relates to the field of organoalkoxysilanes.

BACKGROUND ART

Organoalkoxysilanes are known substances and have long been used as—for example—adhesion promoters. They are frequently also referred to by the skilled worker as silanes. They have alkoxysilane groups, which in contact with water—in liquid form or as atmospheric moisture—are able to hydrolyze to form a silanol group (Si—OH) and then crosslink to siloxane compounds. This can lead to instances of precipitation or hazing even after a very short time. This sensitivity is very pronounced in particular in polar organoalkoxysilanes, and also at basic pH, and therefore in particular in aminosilanes.

When dealing with organoalkoxysilanes, therefore, it must be ensured that they are stored and processed to the exclusion of moisture. In many cases this leads in practice to difficulties, therefore, as for example if a pack is not impervious or if it has been opened and poorly closed.

DISCLOSURE OF THE INVENTION

It is an object of the present invention, therefore, to improve the storage stability of organoalkoxysilanes and more particularly to improve the sensitivity of the organoalkoxysilanes to water, more particularly to atmospheric moisture.

Surprisingly it has been found that the organoalkoxysilane composition of claim 1 is able to achieve this object.

Ways of Performing the Invention

The present invention provides organoalkoxysilane compositions which comprise at least one organoalkoxysilane S and at least one anhydrous surfactant T, the weight fraction of all of the organoalkoxysilanes S being ≧33% by weight, based on the weight of the organoalkoxysilane composition, and the ratio of the weight sum of all the organoalkoxysilanes S to the weight sum of all the anhydrous surfactants T (S:T) has a value of 5:1 to 1:2.

The term "organoalkoxysilane" or "silane" for short refers in the present document to compounds in which on the one hand there is at least one and there are typically two or three alkoxy groups attached directly to the silicon atom (via an Si—O bond), and which on the other hand have at least one organic radical attached directly to the silicon atom (via an Si—C bond) and have no Si—O—Si bonds. Correspondingly, the term "silane group" refers to the silicon-containing group attached to the organic radical of the organoalkoxysilane. A property of the organoalkoxysilanes, or of their silane groups, is to hydrolyze on contact with moisture. This process forms organosilanols, i.e., organosilicon compounds containing one or more silanol groups (Si—OH groups), and, through subsequent condensation reactions, organosiloxanes, i.e., organosilicon compounds containing one or more siloxane groups (Si—O—Si groups).

Terms such as "aminosilane", "epoxysilane", "alkylsilane", and "mercaptosilane" refer to silanes which have the corresponding functional group, in this case therefore an aminoalkylalkoxysilane, epoxyalkylalkoxysilane, alkylalkoxysilane, and mercaptoalkylalkoxysilane.

In the present document the term "anhydrous" should not be interpreted as meaning "absolutely free of water". The epithet "anhydrous" is therefore also used to refer to compounds and compositions which contain small traces of water, i.e., which include a residual water content of not more than 1% by weight, more particularly of not more than 0.5% by weight.

Organoalkoxysilanes S are more particularly aminosilanes, epoxysilanes, mercaptosilanes, and alkylsilanes.

Aminosilanes are more particularly aminosilanes of the formula (I) or the reaction products of the formula (I), which has at least one secondary or primary amino group, with a compound (ARV) which contains at least one functional group which is able to react with a primary or secondary amino group.

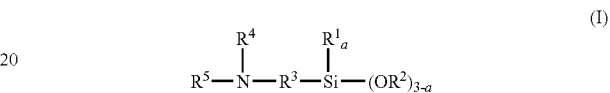

In this formula, $R^1$ is an alkyl group having 1 to 8 C atoms, preferably a methyl or an ethyl group. $R^1$ is preferably a methyl group.

Furthermore, $R^2$ is an alkyl group having 1 to 5 C atoms, preferably a methyl group or an ethyl group or an isopropyl group. $R^2$ is preferably a methyl group or an ethyl group.

Furthermore, $R^3$ is a linear or branched alkylene group having 1 to 4 C atoms. $R^3$ is preferably a propylene group.

Furthermore, $R^4$ is H or a linear or branched alkyl group having 1 to 10 C atoms or is a substituent of the formula (II)

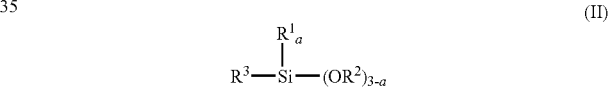

Furthermore, $R^5$ is H or a linear or branched alkyl group having 1 to 10 C atoms or is a linear or branched alkyl group having 1 to 10 C atoms with further heteroatoms or is a substituent of the formula (II)

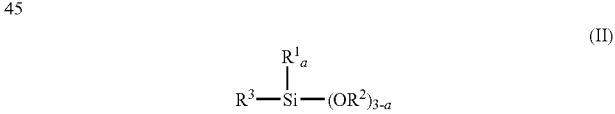

Considered a particularly advantageous radical of a linear alkyl group having 1 to 10 C atoms with further heteroatoms $R^5$ is the radical $CH_2CH_2NH_2$.

Finally, the index a stands for a value 0, 1 or 2, more particularly for 0 or 1. Preferably a stands for 0.

Examples of aminosilanes of the formula (I) of this kind are 3-aminopropyltrimethoxysilane, 3-aminopropyldimethoxymethylsilane, 3-amino-2-methylpropyltrimethoxysilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, 2-aminoethyltrimethoxysilane, 2-aminoethyldimethoxymethylsilane, aminomethyltrimethoxysilane, aminomethyldimethoxymethylsilane, aminomethylmethoxydimethylsilane, N-methyl-3-aminopropyltrimethoxysilane, N-ethyl-3- aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethylaminomethyldimethoxymethylsilane, N-propylaminomethyldimethoxymethylsilane, N-butylaminomethyldimethoxymethylsilane, N-(2-aminoethyl)-3-aminopropyltrimethoxysilane, bis(trimethoxysilylpropyl)amine, tris(trimethoxysilylpropyl)amine, and their analogs with ethoxy or isopropoxy groups instead of the methoxy groups on the silicon.

Preferred aminosilanes of the formula (I) are aminosilanes selected from the group encompassing aminosilanes of the formulae (III), (IV), and (V).

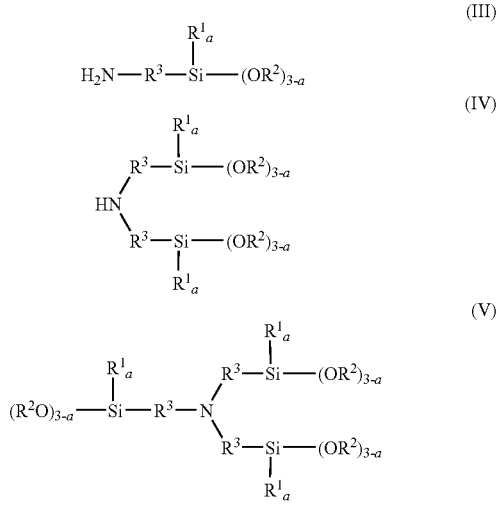

The most preferred aminosilanes of the formula (I) are the aminosilanes 3-aminopropyltrimethoxysilane, N-(2-aminoethyl)-3-aminopropyltrimethoxysilane, 3-[2-(2-aminoethylamino)ethylamino]propyltrimethoxysilane, bis(trimethoxysilylpropyl)amine, and tris(trimethoxysilylpropyl)amine.

In one embodiment the aminosilane is a reaction product of an aminosilane of the formula (I) as described above, and which has at least one secondary or primary amino group, with a compound (ARV) which at least one functional group which is able to react with a comprises or secondary amino group.

This functional group which is able to react with a primary or secondary amino group is preferably an epoxy group. However, there are other groups conceivable, such as isocyanate groups or activated double bonds, for example. Particularly suitable compounds with epoxy groups are epoxysilanes. Preferred compounds (ARV) able to react with the aminosilane of the formula (I) having at least one secondary or primary amino group are epoxysilanes of the formula (VI)

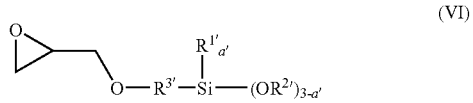

In this formula, $R^{1'}$ is an alkyl group having 1 to 8 C atoms, preferably a methyl or an ethyl group. $R^{2'}$ is an alkyl group having 1 to 5 C atoms. Furthermore, $R^{3'}$ is a linear or branched alkylene group having 1 to 4 C atoms, and a' is 0, 1, or 2, more particularly 0 or 1.

$R^{1'}$ is more particularly a methyl group. $R^{2'}$ is preferably a methyl group or an ethyl group or an isopropyl group. With particular preference, $R^{2'}$ is a methyl group or an ethyl group. $R^{3'}$ is preferably propylene. The index a' is preferably 0.

Examples of epoxysilanes include 2-(3,4-epoxycyclohexyl)ethyltrimethoxysilane, 2-(3,4-epoxycyclohexyl)ethyltriethoxysilane, 3-glycidyloxypropyltriethoxysilane, and 3-glycidyloxypropyltrimethoxysilane.

Considered to be preferred epoxysilanes are 3-glycidyloxypropyltriethoxysilane and 3-glycidyloxypropyltrimethoxysilane. The most preferred epoxysilane is 3-glycidyloxypropyltrimethoxysilane.

The aminosilane of the formula (I) which is used for the reaction product, is, alongside N-(2-aminoethyl)-3-aminopropyltrimethoxysilane and N-(2-aminoethyl)-3-aminopropyltriethoxysilane, preferably N-(2-aminoethyl)-3-aminopropyltrimethoxysilane, more particularly aminosilanes of the formula (III) or (IV), more particularly 3-aminopropyltrimethoxysilane, bis(trimethoxysilylpropyl)amine, 3-aminopropyltriethoxysilane, and bis(triethoxysilylpropyl)amine. Preference is given to 3-aminopropyltrimethoxysilane and bis(trimethoxysilylpropyl)amine.

According to the stoichiometry of the aminosilane of the formula (I) and of the amine-reactive compound (ARV), the reaction product may still have primary or secondary amino groups, or not.

Examples of reaction products of this kind are compounds of the formulae (VII), (VIII), (IX), (X), (XI), and (XII).

The compounds of the formulae (VII), (VIII), and (IX) are obtained from reaction of N-(2-aminoethyl)-3-aminopropyltrimethoxysilane and 3-glycidyloxypropyltrimethoxysilane.

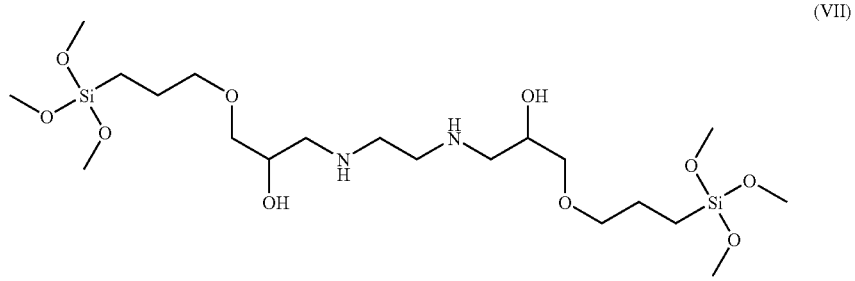

(VIII)

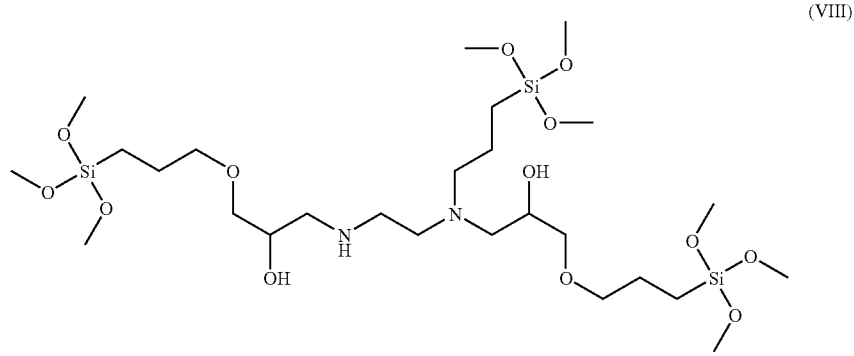

(IX)

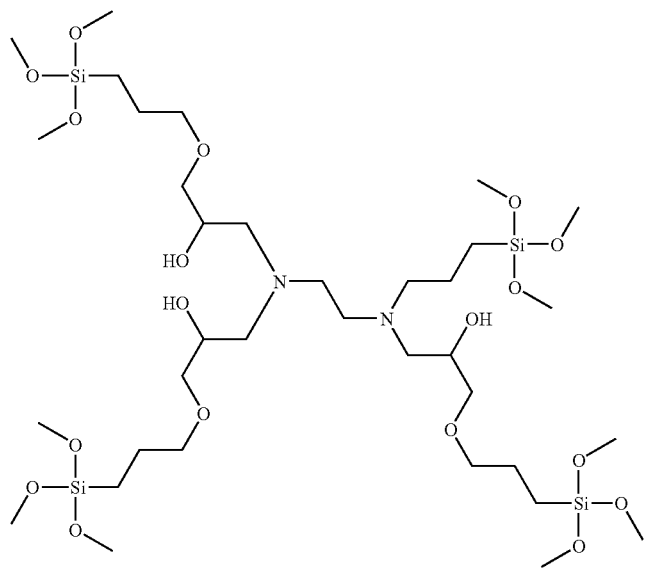

The compounds of the formulae (X) and (XI) are obtained from reaction of 3-aminopropyltrimethoxysilane and 3-glycidyloxypropyltrimethoxysilane.

The compound of the formula (XII) is obtained from the reaction of bis(trimethoxysilylpropyl)amine and 3-glycidyloxypropyltrimethoxysilane.

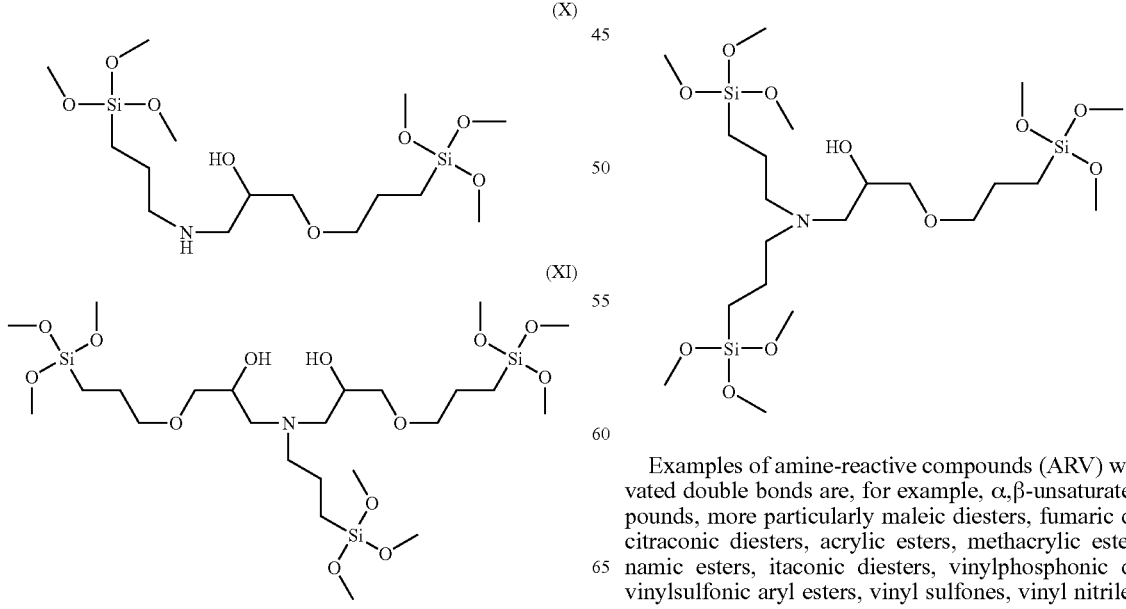

Examples of amine-reactive compounds (ARV) with activated double bonds are, for example, α,β-unsaturated compounds, more particularly maleic diesters, fumaric diesters, citraconic diesters, acrylic esters, methacrylic esters, cinnamic esters, itaconic diesters, vinylphosphonic diesters, vinylsulfonic aryl esters, vinyl sulfones, vinyl nitriles, 1-nitroethylenes or Knoevenagel condensation products such as, for example, those of malonic diesters and aldehydes such as formaldehyde, acetaldehyde or benzaldehyde. Amine-reactive compounds of this kind form Michael adducts in which the amine adds to the double bond. Examples of reaction products of this kind are Michael adducts of 3-aminopropyltrimethoxysilane, 3-aminopropyldimethoxymethylsilane, 4-amino-3,3-dimethylbutyltrimethoxysilane, 4-amino-3,3-dimethylbutyldimethoxymethylsilane, aminomethyltrimethoxysilane or aminomethyldimethoxymethylsilane with dimethyl, diethyl or dibutyl maleate, tetrahydrofurfuryl, isobornyl, hexyl, lauryl, stearyl, 2-hydroxyethyl or 3-hydroxypropyl acrylate, dimethyl, diethyl or dibutyl phosphonate, acrylonitrile, 2-pentenenitrile, fumaronitrile or β-nitrostyrene, and also the analogs of the stated aminosilanes with ethoxy groups instead of the methoxy groups on the silicon. Mention may be made more particularly of the Michael adduct diethyl N-(3-trimethoxysilylpropyl)aminosuccinate.

Examples of amine-reactive compounds (ARV) with isocyanate groups are isocyanatosilanes or polyisocyanates. Isocyanatosilanes include more particularly 3-isocyanatopropyltrimethoxysilane and 3-isocyanatopropyltriethoxysilane. Examples of polyisocyanates include 2,4- and 2,6-tolylene diisocyanate (TDI) and any desired mixtures of these isomers, 4,4'-, 2,4'-, and 2,2'-diphenylmethane diisocyanate (MDI) and any desired mixtures of these and further isomers, 1,3- and 1,4-phenylene diisocyanate, 2,3,5,6-tetramethyl-1,4-diisocyanatobenzene, 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, cyclohexane 1,3- and 1,4-diisocyanate and any desired mixtures of these isomers, 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI), 1,4-diisocyanato-2,2,6-trimethylcyclohexane (TMCDI), m- and p-xylylene diisocyanate (XDI), 1,3- and 1,4-tetramethylxylylene diisocyanate (TMXDI), 1,3- and 1,4-bis(isocyanatomethyl)cyclohexane, oligomers of the aforementioned polyisocyanates, and any desired mixtures of the aforementioned polyisocyanates. Preference is given to MDI, TDI, HDI, and IPDI, and also to their biurets or isocyanurates.

If the organoalkoxysilane S is an epoxysilane then preference is given to the epoxysilanes as described above as amine-reactive compounds (ARV).

Examples of mercaptosilanes as organoalkoxysilane S are 3-mercaptopropyltrimethoxysilane and 3-mercaptopropyltriethoxysilane.

If the organoalkoxysilane S is an alkylsilane then mentioned may be made more particularly of the silanes with $C_1$-$C_6$ alkyl radicals, such as methyltrimethoxysilane, ethyltrimethoxysilane, and butyltrimethoxysilane, for example.

Aminosilanes are preferred over epoxysilanes, mercaptosilanes, and alkylsilanes as organoalkoxysilane S.

The organoalkoxysilanes S more particularly have no chemical groups able to react with the surfactant T.

As surfactants T it is possible to use natural or synthetic compounds which in solutions lower the surface tension of the water or other liquids. As surfactants, also called wetting agents, it is possible to use anionic, cationic, nonionic or ampholytic surfactants or mixtures thereof.

Examples of anionic surfactants are surfactants containing carboxylate, sulfate, phosphate or sulfonate groups, such as amino acid derivatives, fatty alcohol ether sulfates, fatty alcohol sulfates, soaps, alkylphenol ethoxylates, and fatty alcohol ethoxylates, for example, but also alkanesulfonates, olefinsulfonates or alkyl phosphates.

The nonionic surfactants include, for example, ethoxylates, such as, for example, ethoxylated adducts of alcohols, such as, for example, polyoxyalkylene polyols, amines, fatty acids, fatty acid amides, alkylphenols, ethanolamides, fatty amines, polysiloxanes or fatty acid esters, but also alkyl or alkylphenyl polyglycol ethers, such as, for example, fatty alcohol polyglycol ethers, or fatty acid amides, alkylglycosides, sugar esters, sorbitan esters, polysorbates or trialkylamine oxides, but also esters and amides of poly(meth)acrylic acids with polyalkylene glycols or aminopolyalkylene glycols, which at most may be tacked at one end with alkyl groups.

Examples of cationic surfactants are quaternary ammonium or phosphonium compounds, such as, for example, tetraalkylammonium salts, N,N-dialkylimidazoline compounds, dimethyldistearylammonium compounds, or N-alkylpyridine compounds, more particularly ammonium chlorides.

The ampholytic or amphoteric surfactants include ampholyteric electrolytes, known as ampholytes, such as aminocarboxylic acids, for example, and betaines.

Surfactants of this kind are widely available commercially.

Particularly suitable surfactants are nonionic surfactants, more particularly alkoxylated alcohols. Alkoxylated nonionic fluorosurfactants have shown themselves to be especially suitable, more particularly Zonyl® FSO-100, which is available commercially from ABCR, Germany, and alkoxylated alcohols or alkoxylated alkylphenols, more particularly Antarox FM 33, which is available commercially from Rhodia.

The surfactant must be anhydrous, since the introduction of substantial amounts of water by the surfactant can lead to premature hydrolysis of the silanes and hence to storage problems. With regard to the understanding of the term "anhydrous", reference is made to the definition above.

Furthermore, the ratio of organoalkoxysilane S to surfactant T must be kept within a certain ratio. If the ratio S:T is greater than 5:1, the sensitivity to water is not substantially improved. If this ratio is less than 1:2, more particularly less than 2:3, the adhesion is increasingly adversely affected if the silane composition is used as an adhesion promoter.

More particularly for aminosilanes as organoalkoxysilane S, the optimum ratio of organoalkoxysilane S to surfactant T is a value of 3:1 to 2:3.

The organoalkoxysilane composition may comprise further ingredients. Examples of such additions are solvents, inorganic fillers, catalysts, and stabilizers, dyes or pigments.

If such further ingredients are used, then on the one hand it must be ensured that the composition contains not more than 1% by weight, more particularly not more than 0.5% by weight, of water. On the other hand the organoalkoxysilane composition must not contain less than 33% by weight, more particularly not less than 40% by weight, of organoalkoxysilane S.

The preferred organoalkoxysilane compositions are those which are essentially composed solely of organoalkoxysilane S and surfactant T. By "substantially" here is meant that the weight sum of organoalkoxysilane S and surfactant T is more than 90% by weight, more particularly more than 95%, preferably more than 99% by weight, based on the weight of the organoalkoxysilane composition.

Since polar, more particularly water-soluble, organoalkoxysilanes in particular are more sensitive in their storage stability with respect to water, the improvements achievable through the present invention are manifested in particular in the case of polar, more particularly water-soluble, organoalkoxysilanes S. This is the reason why very apolar organoalkoxysilanes S, such as higher alkylalkoxysilanes, for example, such as dodecyltrimethoxysilane or octadecyltrimethoxysilane, are not preferred as organoalkoxysilanes S. The improvement in storage stability with respect to water is particularly significant in the case of aminosilanes as organoalkoxysilanes S.

The organoalkoxysilane compositions, particularly if they include aminosilanes as organoalkoxysilanes S, are significantly less sensitive to the effect of water during the storage period. This behavior is manifested more particularly when water, more particularly in the form of atmospheric moisture, is able to come into contact with the organoalkoxysilane compositions. Reasons for such contact may be, for example, packs which are not impervious. Thus in practice it may well be the case that original packs, for example, are not impervious, or that a storage container is poorly or imperviously reclosed after having been open for the first time, or that said container is exposed to the environment for a certain time with no sealing at all. Finally, the storage stability of the organoalkoxysilane compositions is greatly increased in comparison with the prior art if they are stored in vessels made of plastic. This is the case especially when the ratio of surface area to volume of the container is high—in other words, in the case of low-volume containers. The reason for this is that the plastics typically used for plastic containers, such as polyethylene or polypropylene, in many cases have an inadequate imperviousness to water vapor diffusion. For small volumes, therefore, silane compositions in accordance with the prior art are stored not in plastic containers for but instead in glass or metal containers. Consequently, through the possibility of using plastic containers storing the organoalkoxysilane compositions of the invention, there are massive cost advantages and weight advantages arising, and also additional freedoms in the design and configuration of the packaging.

The improved storage properties and/or reduced sensitivity to water during the storage period are apparent more particularly through the absence, or at least severe retardation, of the formation of precipitates or hazing.

The organoalkoxysilane compositions are used more particularly as adhesion promoters. These adhesion promoters may be part of compositions which are required to exhibit effective adhesion. For instance, organoalkoxysilane compositions are possible as an ingredient of adhesives or sealants. They may also be used in coatings such as paints or floor coverings. In one embodiment the organoalkoxysilanes S in this case may react covalently with reactive groups. Thus, for example, aminosilanes of the formula (I) can be used for this purpose, for reacting with prepolymers containing isocyanate groups and preparing what are known as silane-terminated polyurethanes (SPUR).

The organoalkoxysilane compositions may be used, furthermore, as a pretreatment agent or a part of a pretreatment agent for improving the adhesion of an adhesive or sealant applied thereto. Pretreatment agents of this kind are frequently also referred to as primers. A primer of this kind may be one-component or two-component.

In this context an organoalkoxysilane composition or a composition comprising the organoalkoxysilane compositions is applied to a substrate which is to be adhesively bonded or sealed or coated. After the so-called flash-off time has elapsed, an adhesive, sealant or coating is subsequently applied. The formulations in question here are more particularly reactive—i.e., crosslinking—adhesives, sealants or coatings, more particularly those based on polyurethanes containing isocyanate groups.

Preferred two-component primers are more particularly aqueous two-component primers composed of a component K1 and a component K2. In one embodiment of the invention the first component K1 comprises an organoalkoxysilane composition and the second component K2 comprises water and an acid. Preferably the mixing of components K1 and K2 produces a pH of 2-5, more particularly 3.5-4.5. A primer composition of this kind can be mixed thoroughly by simple shaking, and undergoes rapid hydrolysis, while the condensation and hence the formation of unwanted siloxanes is retarded. As a result, a very good adhesion is built up, without unwanted precipitates or hazing being formed between the mixing and the application of the aqueous primer.

EXAMPLES

TABLE 1

| Organoalkoxysilanes used. | |
|---|---|
| Abbreviation | Organoalkoxysilane |
| A1110 | 3-Aminopropyltrimethoxysilane |
| A1120 | N-(2-Aminoethyl)-3-aminopropyltrimethoxysilane |
| A1130 | 3-[2-(2-Aminoethylamino)ethylamino]propyltrimethoxysilane |
| A1170 | Bis(trimethoxysilylpropyl)amine |
| A187 | 3-Glycidyloxypropyltrimethoxysilane |
| MTMS | Methyltrimethoxysilane |

Furthermore, the reaction product RP1 was prepared from 3-glycidyloxypropyltrimethoxysilane and N-(2-aminoethyl)-3-aminopropyltrimethoxysilane, by mixing 1 mol of A1120 with 3 mol of A187. Immediately after mixing, it was possible to check the conversion by IR. Although the band characteristic of the epoxy group, at about 910 cm$^{-1}$, is still detectable immediately after mixing, it quickly disappears.

TABLE 2

| Surfactants used. | | |
|---|---|---|
| Abbreviation | Surfactant | Supplier |
| "Surfynol" | Surfynol ® 61 | Air Products |
| "Soprophor" | Soprophor BSU | Rhodia, Germany |
| "FM33" | Antarox FM33 | Rhodia, Germany |
| "AE 01" | EnviroGem ® AE 01 | Air Products |
| "AE 02" | EnviroGem ® AE 02 | Air Products |
| "Hydropalat 120" | Hydropalat ® 120 | Cognis, Germany |

In Table 3 the ratio of organoalkoxysilane to surfactant was varied. The organoalkoxysilane used was the reaction product RP1, and it was combined with different surfactants.

In the first reference series Ref.S1 no surfactant was used, in other words pure organoalkoxysilane was used. In the second and third reference series Ref.S2 and Ref.S3, respectively, the ratio was 20:1 and 10:1, respectively.

The respective surfactant was added to 2.5 g of the reaction product RP1 in a glass vessel (diameter 12 mm, 4 cm high, volume about 4.5 ml, with plastic screw lid) which beforehand was dried at 200° C. in an oven for one day and cooled to room temperature at 25° C./50% relative humidity. Subsequently the vessels filled in this way were closed with a lid and stored in an oven (Ehret, TK/L 4061) with air circulation at 50° C. For 30 days the samples were inspected daily. Table 3 specifies the stability, more specifically by stating the number of days that passed until the sample was observed to have gelled. If the sample was still perfect after day 30, the value >30 has been indicated.

TABLE 3

Stability (number of days to gelling) of organoalkoxysilane-surfactant mixtures up to 50° C. in a closed vessel.

| | RP1:Surfactant [g:g] | | | | | | |
|---|---|---|---|---|---|---|---|
| | 1:0 | 20:1 | 10:1 | 5:1 | 2:1 | 1:1 | 1:2 |
| Surfactant | Ref. S1 | Ref. S2 | Ref. S3 | BS1 | BS2 | BS3 | BS4 |
| Surfynol | 1 | 1 | 1 | 2 | >30 | >30 | >30 |
| Soprophor | 1 | 1 | 1 | 1 | >10 | >30 | >30 |
| AE 01 | 1 | 1 | 3 | 3 | 10 | >30 | >30 |
| Hydropalat 120 | 1 | 1 | 1 | 2 | >30 | >30 | >30 |
| Fraction of S as a proportion of composition [% by weight] | 100 | 95 | 91 | 83 | 66 | 50 | 33 |

In Table 4, different silanes and different surfactants were mixed as described above in a mixing ratio S:T of 2.125:1, corresponding to an organoalkoxysilane S fraction of 68% by weight as a proportion of the total weight of the entire composition. In this series of experiments, however, drills were used to drill a hole of 1 mm into the lid, in order to simulate a non-impervious pack. Storage and the determination of the stability take place as for the experiments of Table 3. The comparative experimental series Ref. S4 took place without addition of surfactants, i.e., in the form of pure organoalkoxysilanes.

TABLE 4

Stability (number of days to gelling) of organoalkoxysilane-surfactant mixtures at 50° C. in a vessel with a hole in the lid.

| | BS5 | BS6 | BS7 | REF. S4 |
|---|---|---|---|---|
| Surfactant | Surfynol | AE 01 | Hydropalat 120 | — |
| A1130 | 7 | 1 | 6 | 1 |
| A1170 | 1 | 4 | 1 | 1 |
| MTMS | >30 | >30 | 10 | 1 |

In a further series of experiments, the storage stabilities of compositions comprising reaction products of aminosilanes and epoxysilanes, with different surfactants, were compared.

In this series the above-described reaction product RP1 was used. In addition a reaction product RP2 was prepared from 3-glycidyloxypropyltrimethoxysilane and 3-[2-(2-aminoethylamino)ethylamino]propyltrimethoxysilane, by mixing 1 mol of A1130 with 6.6 mol of A187.

In Table 5, RP1 or RP2 was mixed as described above with different surfactants in a mixing ratio S:T of 2.125:1, corresponding to an organoalkoxysilane S fraction of 68% by weight as a proportion of the total weight of the entire composition. In this experimental series the vessel with a closed lid (without a hole as for Table 4) was stored at 50° C., as already described, in the oven, or at 23° C./50% relative humidity. The stability was determined as for the experiments of Table 3. The comparative experiment series Ref.S5 took place without addition of surfactants, i.e., in the form of pure organoalkoxysilanes.

TABLE 5

Stability (number of days to gelling) of organoalkoxysilane-surfactant mixtures at 50° C. and 23° C. in a closed vessel.

| | | RP1 | | RP2 | |
|---|---|---|---|---|---|
| | Surfactant | 23° C. | 50° C. | 23° C. | 50° C. |
| BS8 | Surfynol | >90 | >90 | >90 | >90 |
| BS9 | Soprophor | 84 | >90 | 84 | >90 |
| BS10 | FM33 | 25 | >90 | 74 | 74 |
| BS11 | AE 01 | >90 | 29 | >90 | 1 |
| BS12 | AE 02 | >90 | 1 | >90 | >90 |
| BS13 | Hydropalat 120 | >40 | >40 | >40 | >40 |
| Ref. S5 | Without surfactant | 9 | 1 | 32 | 8 |

Preparation of Aqueous Primers

Organoalkoxysilane compositions were prepared from A1110 and various surfactants in the ratios indicated in Table 6 and were used as a first component K1 of an aqueous primer. The second component K2 consisted of water and 1% by weight of acetic acid. 1.05 g of component K1 was added to 49 g of component K2 and the mixture was shaken.

This mixture was subsequently applied to the ceramic edge of a VSG front windshield of a Mitsubishi Space Wagon, from Splintex, using a cellulose cloth (Tela®, Tela-Kimberly Switzerland GmbH) soaked with the mixture. After a flash-off time of 10 minutes, the one-component moisture-curing polyurethane adhesive Sikaflex®-250 DM-2 or Sikaflex®-250 HMW-2+, both of which contain polyurethane prepolymers with isocyanate groups and are available commercially from Sika Schweiz AG, was applied as a circular bead, using a cartridge press and a nozzle, and cured at 23° C. and 50% relative humidity for 4 days.

Adhesion Test ("Bead Test")

The adhesion of the adhesive was tested by means of the 'bead test'. In this test an incision is made at the end just above the adhesion face. The incised end of the bead is held with round-end tweezers and pulled from the substrate. This is done by carefully rolling up the bead on the tip of the tweezers, and placing a cut vertical to the bead pulling direction down to the bare substrate. The rate of bead removal is selected so that a cut has to be made about every 3 seconds. The test length must amount to at least 8 cm. An assessment is made of the adhesive which remains on the substrate after the bead has been pulled off (cohesive fracture). The adhesion properties are evaluated by estimation of the cohesive fraction of the adhesion face:

1=>95% cohesive fracture
2=75-95% cohesive fracture
3=25-75% cohesive fracture
4=<25% cohesive fracture
5=0% cohesive fracture (purely adhesive fracture)

Test results within a valuation of 4 or 5 are considered inadequate.

The adhesion results are reported in Tables 6 and 7.

TABLE 6

Aqueous primer with silane/surfactant mixture in component K1. Adhesion of Sikaflex ® 250 DM-2.

| | Sikaflex ® 250 DM-2 A1110:surfactant [g:g] | | | | |
|---|---|---|---|---|---|
| | 1:0 | 2:1 | 1:1 | 1:2 | 1:10 |
| Surfactant | Ref. S6 | BS14 | BS15 | BS16 | Ref. S7 |
| Surfynol | 2 | 1 | 2 | 3 | 3 |
| Soprophor | 2 | 1 | 2 | 2 | 3 |
| Hydropalat 120 | 2 | 1 | 2 | 2 | 3 |

TABLE 6-continued

Aqueous primer with silane/surfactant mixture in component K1. Adhesion of Sikaflex ® 250 DM-2.

| | Sikaflex ® 250 DM-2 A1110:surfactant [g:g] | | | | |
|---|---|---|---|---|---|
| Surfactant | 1:0 Ref. S6 | 2:1 BS14 | 1:1 BS15 | 1:2 BS16 | 1:10 Ref. S7 |
| Fraction of S as a proportion of comp. K1 [% by weight] | 100 | 66 | 50 | 33 | 9 |

TABLE 7

Aqueous primer with silane/surfactant mixture in component K1. Adhesion of Sikaflex ® 250 HMV-2+.

| | Sikaflex ® 250 HMV-2+ A1110:surfactant [g:g] | | | | |
|---|---|---|---|---|---|
| Surfactant | 1:0 Ref. 38 | 2:1 BS17 | 1:1 BS18 | 1:2 BS19 | 1:10 Ref. S9 |
| Surfynol | 4 | 4 | 4 | 3 | 5 |
| Soprophor | 4 | 1 | 2 | 4 | 4 |
| Hydropalat 120 | 4 | 3 | 3 | 4 | 4 |
| Fraction of S as a proportion of comp. K1 [% by weight] | 100 | 66 | 50 | 33 | 9 |

The invention claimed is:

1. An organoalkoxysilane composition comprising at least one organoalkoxysilane S and at least one anhydrous surfactant T, wherein
the at least one organoalkoxysilane S has no chemical group that is able to react with the at least one anhydrous surfactant T,
a weight fraction of a sum of all of the organoalkoxysilanes S is ≧33% by weight, based on a weight of the organoalkoxysilane composition, and
a ratio of the weight sum of all the organoalkoxysilanes S to a weight sum of all the anhydrous surfactants T (S:T) has a value of 5:1 to 1:2.

2. The organoalkoxysilane composition of claim 1, wherein at least one of the at least one surfactant T is a nonionic surfactant.

3. The organoalkoxysilane composition of claim 1, wherein the weight ratio of organoalkoxysilane S to anhydrous surfactant T (S:T) has a value of 3:1 to 2:3.

4. The organoalkoxysilane composition of claim 1, wherein the weight fraction of the sum of all the organoalkoxysilanes S is ≦40% by weight, based on the weight of the organoalkoxysilane composition.

5. The organoalkoxysilane composition of claim 1, wherein at least one of the at least one organoalkoxysilane S is an aminosilane.

6. The organoalkoxysilane composition of claim 5, wherein the aminosilane is selected from the group consisting of aminosilanes defined by formulae (III), (IV), and (V):

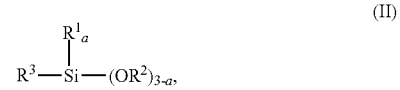

(III)

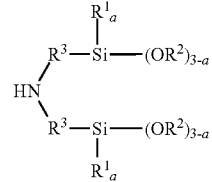

(IV)

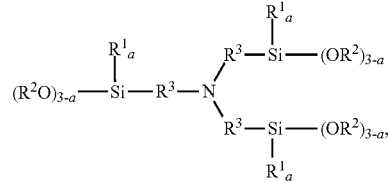

(V)

wherein
$R^1$ is an alkyl group having 1 to 8 C atoms;
$R^2$ is an alkyl group having 1 to 5 C atoms;
$R^3$ is a linear or branched alkylene group having 1 to 4 C atoms; and
a is 0, 1, or 2.

7. The organoalkoxysilane composition of claim 6, wherein the organoalkoxysilane S is a reaction product of an aminosilane of formulae (III) or (IV) with a compound containing epoxy groups.

8. The organoalkoxysilane composition of claim 5, wherein:
the organoalkoxysilane S is a reaction product of:
an aminosilane of formula (I) having at least one secondary or primary amino group, and
a compound (ARV) that contains at least one functional group that is able to react with a primary or secondary amino group; and
formula (I) is:

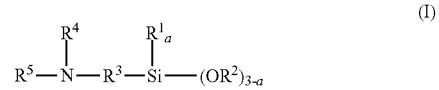

(I)

where:
$R^1$ is an alkyl group having 1 to 8 C atoms;
$R^2$ is an alkyl group having 1 to 5 C atoms;
$R^3$ is a linear or branched alkylene group having 1 to 4 C atoms;
$R^4$ is H, a linear or branched alkyl group having 1 to 10 C atoms, or a substituent of a formula (II):

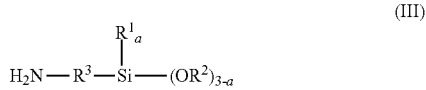

(II)

$R^5$ is H, a linear or branched alkyl group having 1 to 10 C atoms, a linear or branched alkyl group having 1 to 10 C atoms with further heteroatoms, or a substituent of a formula (II), and
a is 0, 1, or 2.

9. The organoalkoxysilane composition of claim 8, wherein the functional group that is able to react with a primary or secondary amino group is an epoxy group.

10. The organoalkoxysilane composition of claim 9, wherein the compound containing the epoxy group is an epoxysilane of formula (VI):

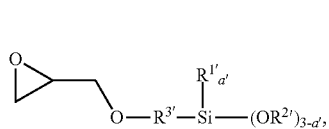

where
- $R^{1'}$ is an alkyl group having 1 to 8 C atoms;
- $R^{2'}$ is an alkyl group having 1 to 5 C atoms;
- $R^{3'}$ is a linear or branched alkylene group having 1 to 4 C atoms; and
- $a'$ is 0, 1, or 2.

11. The organoalkoxysilane composition of claim 5, wherein the aminosilane is defined by formula (I):

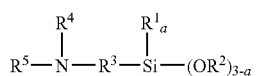

where $R^1$ is an alkyl group having 1 to 8 C atoms;
$R^2$ is an alkyl group having 1 to 5 C atoms;
$R^3$ is a linear or branched alkylene group having 1 to 4 C atoms;
$R^4$ is H a linear or branched alkyl group having 1 to 10 C atoms, or a substituent defined by formula (II):

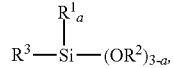

where $R^1$, $R^2$, and $R^3$ are as defined above,
$R^5$ is H, a linear or branched alkyl group having 1 to 10 C atoms, a linear or branched alkyl group having 1 to 10 C atoms with further heteroatoms, or a substituent defined by formula (II), and
a is 0, 1, or 2.

12. The organoalkoxysilane composition of claim 11, wherein $R^5$ is $CH_2CH_2NH_2$.

13. The organoalkoxysilane composition of claim 11, wherein, in formula (I), a is 0, $R^2$ is methyl, and $R^3$ is propylene.

14. A method for promoting adhesion, comprising applying the organoalkoxysilane composition of claim 1 to a substrate.

15. A method for pretreatment, comprising applying the organoalkoxysilane composition of claim 1 as an agent for pretreating to substrate surfaces to be adhesively bonded or sealed, in order to improve the adhesion of an adhesive or sealant applied thereto.

16. A method for pretreatment agent formation, comprising mixing the organoalkoxysilane composition of claim 1 with a second component, wherein the second component includes water and an acid.

* * * * *